US012768482B2

(12) United States Patent
Takahashi et al.

(10) Patent No.: US 12,768,482 B2
(45) Date of Patent: Oct. 20, 2026

(54) BRANCHING PIPE AND METHOD FOR MANUFACTURING BRANCHING PIPE

(71) Applicant: JGC CORPORATION, Kanagawa (JP)

(72) Inventors: Atsushi Takahashi, Kanagawa (JP); Osamu Yamazaki, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 0 days.

(21) Appl. No.: 19/489,269

(22) PCT Filed: Aug. 31, 2023

(86) PCT No.: PCT/JP2023/031939
§ 371 (c)(1),
(2) Date: Dec. 2, 2025

(87) PCT Pub. No.: WO2025/046868
PCT Pub. Date: Mar. 6, 2025

(65) Prior Publication Data
US 2026/0258895 A1 Sep. 3, 2026

(51) Int. Cl.
*F16L 41/08* (2006.01)

(52) U.S. Cl.
CPC .................................. *F16L 41/082* (2013.01)

(58) Field of Classification Search
CPC ....... F16L 41/082; F16L 41/084; F16L 41/02; F16L 41/026; F16L 41/08; F16L 13/0245;
(Continued)

(56) References Cited

U.S. PATENT DOCUMENTS 1,847,361 A * 3/1932 Pollei .................... F16L 41/084 219/137 R
2,496,677 A * 2/1950 Reedy .................. F16L 41/084 220/640
(Continued)

FOREIGN PATENT DOCUMENTS

CN 112439979 3/2021
CN 112453641 3/2021
(Continued)

OTHER PUBLICATIONS

"International Search Report (Form PCT/ISA/210) of PCT/JP2023/031939", mailed on Nov. 21, 2022, with English translation thereof, pp. 1-5.

*Primary Examiner* — Aaron M Dunwoody
(74) *Attorney, Agent, or Firm* — JCIPRNET

(57) ABSTRACT

Provided is a branching pipe including: a main pipe that includes a main pipe inner layer portion and a main pipe outer layer portion, and is provided with a main pipe branch hole penetrating through the main pipe inner layer portion and the main pipe outer layer portion, and in the main pipe branch hole, a diameter of an outer-layer-side opening formed in an outer layer surface is larger than a diameter of an inner-layer-side opening formed in the inner layer surface; a branch pipe that extends in a direction intersecting a direction of an axis of the main pipe; and a connection portion that connects a branch pipe lower end surface of the branch pipe to the main pipe branch hole of the main pipe. The main pipe outer layer portion is composed of a material different from that of the main pipe inner layer portion.

7 Claims, 12 Drawing Sheets

(58) Field of Classification Search
CPC .. F16L 13/0218; B23P 11/00; B23K 2101/04; B23K 2101/06; Y10T 29/49428; Y10T 29/4943; Y10T 29/49444
USPC ................................................ 228/44.5, 49.3
See application file for complete search history.

(56) References Cited

U.S. PATENT DOCUMENTS

| | | | | | |
|---|---|---|---|---|---|
| 3,516,692 | A | * | 6/1970 | Albrecht | F15D 1/00 285/133.4 |
| 4,179,141 | A | * | 12/1979 | Newman | F16L 41/082 228/168 |
| 4,615,477 | A | * | 10/1986 | Spada | F22B 37/104 228/183 |
| 2021/0270400 | A1 | * | 9/2021 | Allen | F16L 23/026 |

FOREIGN PATENT DOCUMENTS

| | | |
|---|---|---|
| JP | S56131079 | 10/1981 |
| JP | S6170396 | 4/1986 |
| JP | H08141741 | 6/1996 |

* cited by examiner

BRANCHING PIPE AND METHOD FOR MANUFACTURING BRANCHING PIPE

CROSS-REFERENCE TO RELATED APPLICATION

This application is a 371 application of the International PCT application serial no. PCT/JP2023/031939, filed on Aug. 31, 2023. The entirety of the above-mentioned patent application is hereby incorporated by reference herein and made a part of this specification.

TECHNICAL FIELD

The present invention relates to a branching pipe and a method for manufacturing the branching pipe.

BACKGROUND ART

A plant in which petroleum processing or gas processing is performed includes a portion through which a corrosive fluid, such as hydrogen sulfide or a chloride (hereinafter referred to as "corrosive fluid"), flows. In a portion through which a corrosive fluid flows, such as a tower, a tank, equipment, and a pipe, a so-called clad pipe may be used. The clad pipe is a composite material obtained by joining dissimilar metals. The clad pipe has, for example, a laminated structure including a base material portion composed of carbon steel and a clad material portion composed of a nickel alloy or the like. By appropriately selecting the material of the clad material portion, corrosion resistance can be provided against corrosive fluid.

In a plant in which petroleum processing, gas processing, or the like is performed, fluids are branched or merged. For such branching and merging, a branch portion is provided in the clad pipe. For example, Patent Literature 1 describes a method for connecting a branch pipe to a corrosion-resistant alloy composite pipe.

CITATION LIST

Patent Literature

Patent Literature 1: Chinese Patent Application Publication No. 112439979

SUMMARY OF INVENTION

Technical Problem

In a case where a branch portion is provided in a clad pipe, this involves providing a through-hole in the clad pipe. Since the clad pipe is laminated with dissimilar materials, a joint between the dissimilar materials is exposed on the inner circumferential surface of this through-hole. When a fluid comes into contact with the joint between dissimilar materials, the corrosion of the material with a relatively higher ionization tendency is promoted. This phenomenon is referred to as galvanic corrosion. Therefore, in a case where a branching pipe including a clad pipe is formed, a measure is required to suppress the occurrence of galvanic corrosion.

The present invention provides a branching pipe capable of suppressing the occurrence of galvanic corrosion, and a method for manufacturing the branching pipe.

Solution to Problem

According to an embodiment of the present invention, there is provided a branching pipe including: a main pipe that includes a main pipe inner layer portion and a main pipe outer layer portion surrounding the main pipe inner layer portion, the main pipe being provided with a main pipe branch hole which penetrates through the main pipe inner layer portion and the main pipe outer layer portion, and in the main pipe branch hole, a diameter of an opening formed in an outer layer surface which is an outer circumferential surface of the main pipe outer layer portion is larger than a diameter of an opening formed in an inner layer surface which is an inner circumferential surface of the main pipe inner layer portion; a branch pipe that extends in a direction intersecting an axial direction of the main pipe; and a connection portion that connects an end of the branch pipe to the outer layer surface of the main pipe. The connection portion includes a main pipe side connection weld portion that covers a main pipe contact portion in which the main pipe inner layer portion and the main pipe outer layer portion are in contact with each other and which is exposed at the main pipe branch hole, and a branch pipe side connection weld portion that is provided between the main pipe side connection weld portion and the end of the branch pipe and connects the branch pipe to the main pipe, and the main pipe outer layer portion is composed of a material different from that of the main pipe inner layer portion.

In this branching pipe, the diameter of the opening formed in the outer layer surface is larger than the diameter of the opening formed in the inner layer surface. With the main pipe branch hole having such a configuration, since a welding rod is easily inserted from the opening formed in the outer layer surface toward the opening formed in the inner layer surface, the main pipe side connection weld portion can be easily provided at the portion in which the main pipe inner layer portion and the main pipe outer layer portion are in contact with each other. Therefore, since the fluid does not come into contact with the portion in which the main pipe inner layer portion and the main pipe outer layer portion are in contact with each other, the occurrence of galvanic corrosion can be suppressed.

In the branching pipe according to the embodiment, the main pipe side connection weld portion may include an inner buildup exposed surface exposed from the inner layer surface. In this configuration, the inner buildup exposed surface is exposed from the inner layer surface of the main pipe. As a result, the main pipe side connection weld portion covers a region from the portion in which the main pipe inner layer portion and the main pipe outer layer portion are in contact with each other to the opening formed in the inner layer surface. Therefore, since the fluid is less likely to reach the portion in which the main pipe inner layer portion and the main pipe outer layer portion are in contact with each other, the occurrence of galvanic corrosion can be further suppressed.

In the branching pipe according to the embodiment, an area of the main pipe side connection weld portion along the outer layer surface may be larger than an area of the inner buildup exposed surface. In this configuration, it is possible to ensure a large region in which the main pipe side connection weld portion and the branch pipe side connection weld portion are in contact with each other. As a result, the main pipe side connection weld portion can be favorably connected to the branch pipe side connection weld portion.

In the branching pipe according to the embodiment, the connection portion may further include a ring member disposed in the main pipe branch hole, and the main pipe side connection weld portion may include a buildup outer circumferential surface that is in contact with a branch hole inner circumferential surface that is an inner circumferential surface of the main pipe branch hole and covers the main pipe contact portion, and a buildup inner circumferential surface that is in contact with a ring outer circumferential surface that is an outer circumferential surface of the ring member. In this configuration, the inner circumferential surface of the ring member disposed in the main pipe branch hole defines the flow path. As a result, the flow path can have a desired configuration.

In the branching pipe according to the embodiment, a flow path formed by the main pipe, the branch pipe, and the connection portion may be defined by the inner layer surface, the inner buildup exposed surface, a ring inner circumferential surface which is an inner circumferential surface of the ring member, a connection weld portion inner circumferential surface which is an inner circumferential surface of the branch pipe side connection weld portion, and a branch pipe inner circumferential surface which is an inner circumferential surface of the branch pipe, and the main pipe inner layer portion, the main pipe side connection weld portion, the ring member, the branch pipe side connection weld portion, and the branch pipe may be composed of materials having corrosion resistance equivalent to each other. In this configuration, a flow path through which a corrosive fluid flows can be formed of materials having corrosion resistance equivalent to each other.

In the branching pipe according to the embodiment, when viewed from the axial direction of the branch pipe, a position of an outer circumferential edge of the branch pipe may be outward of a position of an outer circumferential edge of the main pipe side connection weld portion. In this configuration, the relatively thick branch pipe can be connected.

In the branching pipe according to the embodiment, when viewed from the axial direction of the branch pipe, the position of the outer circumferential edge of the branch pipe may be inward of the position of the outer circumferential edge of the main pipe side connection weld portion. In this configuration, the relatively thin branch pipe can be connected.

In the branching pipe according to the embodiment, when viewed from the axial direction of the branch pipe, a position of an inner circumferential edge of the branch pipe may be inward of a position of an inner circumferential edge of the main pipe side connection weld portion. In this configuration, a step is provided between the inner circumferential surface of the branch pipe and the inner circumferential surface of the main pipe side connection weld portion. The ring member can be disposed on this step.

According to another embodiment of the present invention, there is provided a method for manufacturing a branching pipe, the method including: a step of forming, in a main pipe including a main pipe inner layer portion and a main pipe outer layer portion surrounding the main pipe inner layer portion and composed of a material different from that of the main pipe inner layer portion, a main pipe branch hole which penetrates through the main pipe inner layer portion and the main pipe outer layer portion and in which a diameter of an opening formed in an outer layer surface which is an outer circumferential surface of the main pipe outer layer portion is larger than a diameter of an opening formed in an inner layer surface which is an inner circumferential surface of the main pipe inner layer portion; a step of forming a main pipe side connection weld portion that covers a main pipe contact portion in which the main pipe inner layer portion and the main pipe outer layer portion are in contact with each other and which is exposed at the main pipe branch hole; and a step of forming, between an end of a branch pipe extending in a direction intersecting an axial direction of the main pipe and disposed to face the main pipe side connection weld portion and the main pipe side connection weld portion, a branch pipe side connection weld portion connecting the branch pipe to the main pipe.

In the method for manufacturing this branching pipe, the main pipe branch hole is provided in which the diameter of the opening formed in the outer layer surface is larger than the diameter of the opening formed in the inner layer surface. With the main pipe branch hole having such a configuration, since the welding rod is easily inserted from the opening formed in the outer layer surface toward the opening formed in the inner layer surface, the main pipe side connection weld portion can be easily provided at the portion in which the main pipe inner layer portion and the main pipe outer layer portion are in contact with each other. Therefore, since the fluid does not come into contact with the portion in which the main pipe inner layer portion and the main pipe outer layer portion are in contact with each other, the occurrence of galvanic corrosion can be suppressed.

The method for manufacturing a branching pipe according to the another embodiment may further include a step of providing a ring member in the main pipe branch hole after the step of forming the main pipe branch hole. In step of forming the main pipe side connection weld portion, the main pipe side connection weld portion may be formed between the branch hole inner circumferential surface which is the inner circumferential surface of the main pipe branch hole and the ring outer circumferential surface which is the outer circumferential surface of the ring member. In this step, the flow path of the fluid can be defined by the inner circumferential surface of the ring member disposed in the main pipe branch hole. As a result, the flow path can have a desired configuration.

Advantageous Effects of Invention

In the branching pipe and the method for manufacturing the branching pipe of the present invention, the occurrence of galvanic corrosion can be suppressed.

BRIEF DESCRIPTION OF DRAWINGS

In FIG. 4, (b) is an enlarged cross-sectional perspective view illustrating a branch pipe and a main pipe side connection weld portion of a branching pipe according to another modification example.

DESCRIPTION OF EMBODIMENTS

Hereinafter, embodiments of the present invention will be described in detail with reference to the accompanying drawings. In the description of the drawings, the same elements are denoted by the same reference signs, and redundant description will be omitted.

Figure 1:
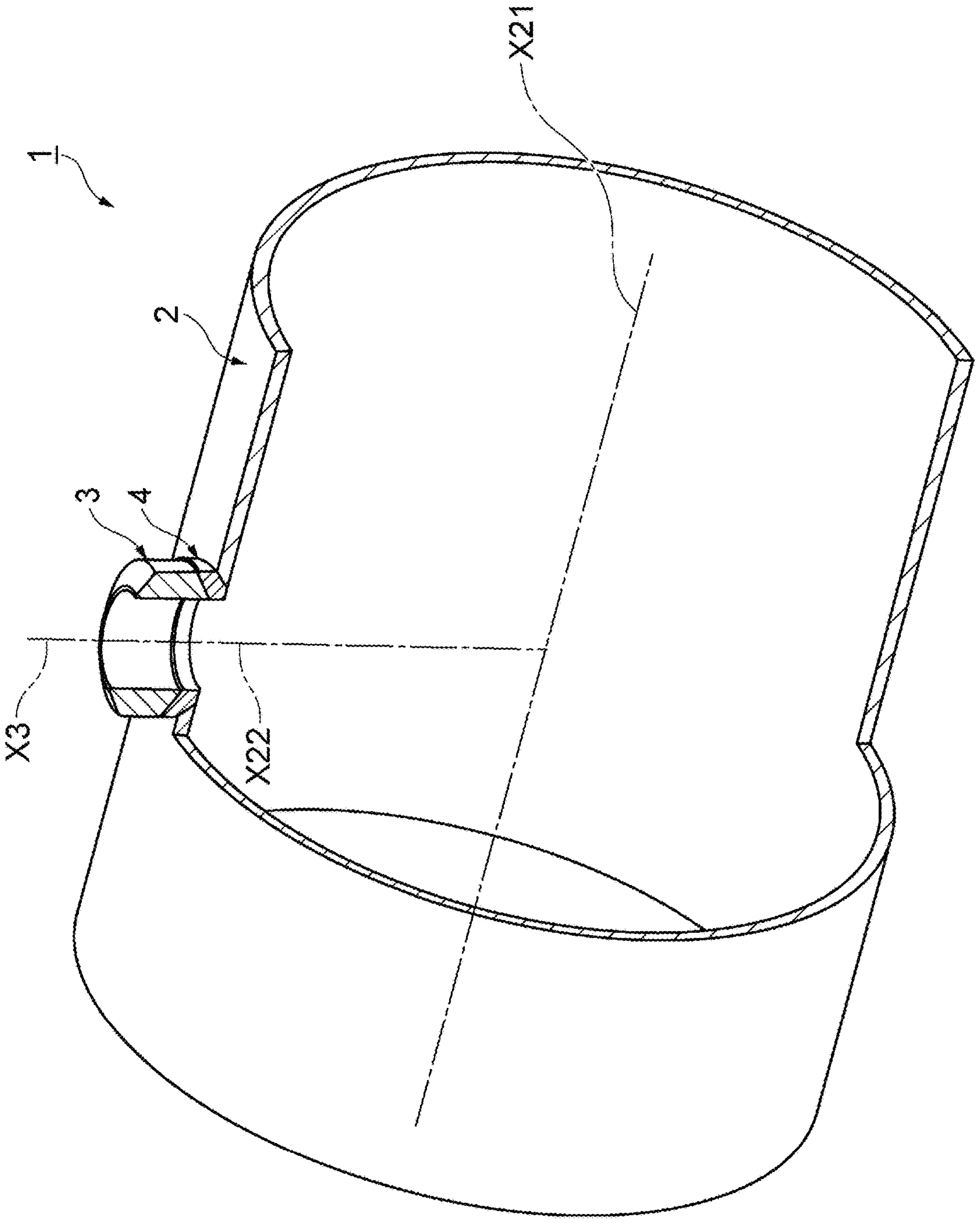
FIG. 1 is a perspective view of a branching pipe partially shown in a cross-sectional view.

A branching pipe 1 illustrated in FIG. 1 is a pipe through which a corrosive fluid flows. Examples of the corrosive fluid include fluids containing hydrogen sulfide and a chloride. In a plant in which petroleum processing, gas processing, or the like is performed, the branching pipe 1 is used to branch or merge the corrosive fluid flowing inside the branching pipe 1.

The branching pipe 1 includes a main pipe 2, a branch pipe 3, and a connection portion 4. The corrosive fluid flows inside the main pipe 2. A part of the corrosive fluid flowing inside the main pipe 2 is branched, and a part of the corrosive fluid flows inside the branch pipe 3.

The main pipe 2 is a so-called clad pipe. The main pipe 2 has a cylindrical shape. The main pipe 2 has an axis X21. The branch pipe 3 has a cylindrical shape. An axis X3 of the branch pipe 3 intersects the axis X21. In the present embodiment, the axis X3 is orthogonal to the axis X21. The axis X3 may not be orthogonal to the axis X21. For example, the axis X3 may be inclined at 45° with respect to the axis X21. The inner diameter of the branch pipe 3 may be smaller than the inner diameter of the main pipe 2. Furthermore, the outer diameter of the branch pipe 3 may be smaller than the outer diameter of the main pipe 2. The connection portion 4 is provided between the outer circumferential surface of the main pipe 2 and the end of the branch pipe 3, and connects the branch pipe 3 to the main pipe 2.

Figure 2:
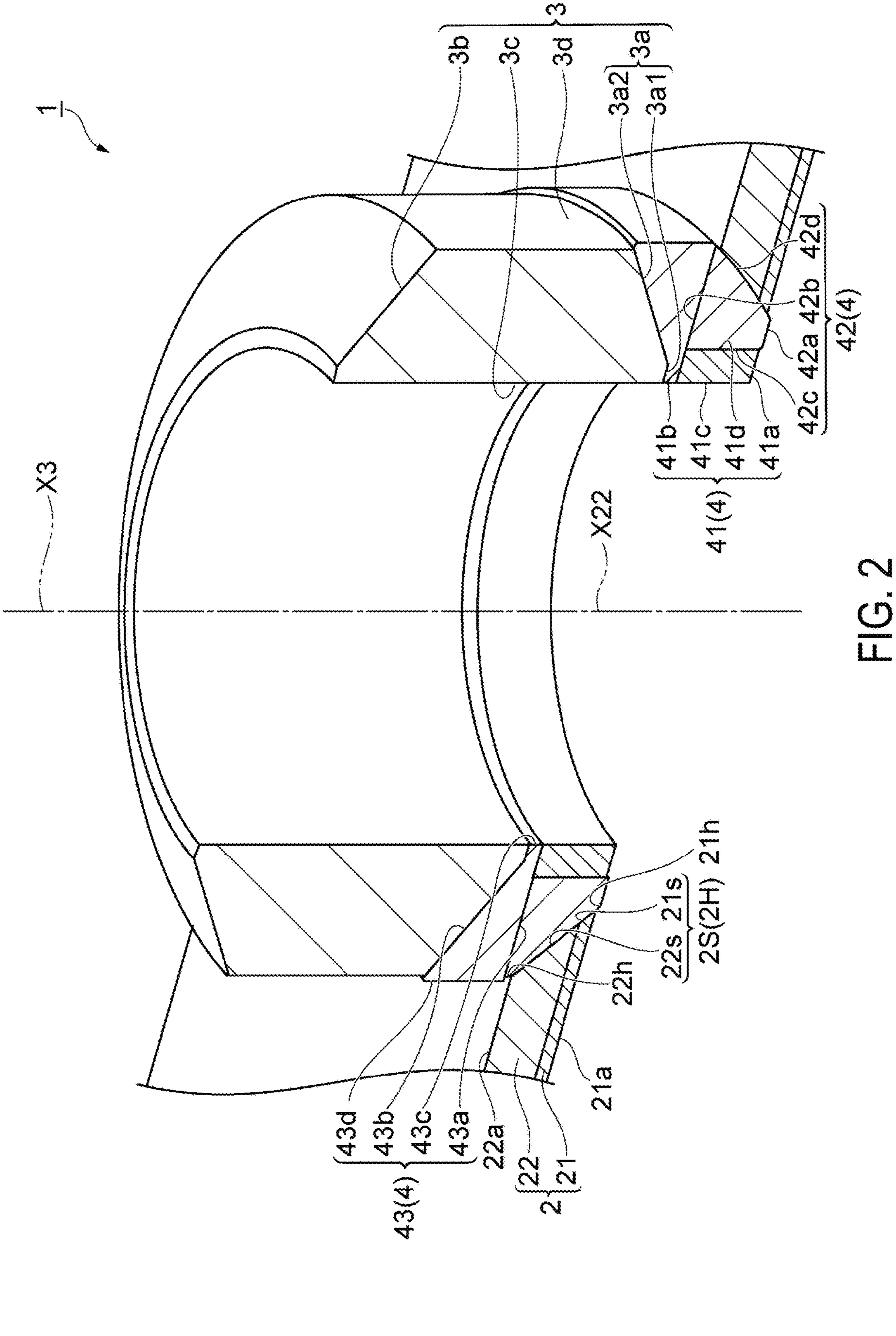
FIG. 2 is a partially enlarged view of FIG. 1.

FIG. 2 is an enlarged cross-sectional perspective view illustrating the branch pipe 3 and the connection portion 4. The main pipe 2 includes a main pipe inner layer portion 21 and a main pipe outer layer portion 22. The main pipe inner layer portion 21 of the main pipe 2 constitutes an inner portion of the main pipe 2. The main pipe inner layer portion 21 includes an inner layer surface 21*a* that constitutes the inner circumferential surface of the main pipe 2. The corrosive fluid comes into contact with the inner layer surface 21*a*. The main pipe inner layer portion 21 is composed of a material having corrosion resistance. In the present specification, "corrosion resistance" refers to the property of being resistant to corrosion by a corrosive fluid. Note that the branching pipe 1 of the present embodiment is designed with a focus on corrosion resistance. A material constituting the branching pipe 1 for ensuring corrosion resistance will be described in detail later.

The main pipe outer layer portion 22 is a portion surrounding the main pipe inner layer portion 21. The main pipe outer layer portion 22 includes an outer layer surface 22*a* that constitutes the outer circumferential surface of the main pipe 2. The main pipe outer layer portion 22 is composed of a material different from that of the main pipe inner layer portion 21. The main pipe outer layer portion 22 is composed of a material that improves the strength of the main pipe 2.

The main pipe 2 is provided with a main pipe branch hole 2H. The main pipe branch hole 2H has an axis X22 overlapping the axis X3 of the branch pipe 3 and penetrates through the main pipe inner layer portion 21 and the main pipe outer layer portion 22. The main pipe branch hole 2H includes an inner-layer-side opening 21*h* and an outer-layer-side opening 22*h*. The inner-layer-side opening 21*h* is formed on the inner layer surface 21*a*. The outer-layer-side opening 22*h* is formed on the outer layer surface 22*a*. The inner diameter of the outer-layer-side opening 22*h* is larger than the inner diameter of the inner-layer-side opening 21*h*. That is, the main pipe branch hole 2H has a truncated cone shape. More specifically, the inner diameter of the main pipe branch hole 2H increases with the distance from the axis X21.

The branch pipe 3 includes a branch pipe lower end surface 3*a*, a branch pipe upper end surface 3*b*, a branch pipe inner circumferential surface 3*c*, and a branch pipe outer circumferential surface 3*d*. The branch pipe lower end surface 3*a* faces the main pipe 2 via the connection portion 4. The branch pipe upper end surface 3*b* is an end surface opposite to the branch pipe lower end surface 3*a*, and is connected to another pipe (not illustrated). The branch pipe inner circumferential surface 3*c* is an inner circumferential surface of the branch pipe 3 and is in contact with the corrosive fluid described above. The branch pipe outer circumferential surface 3*d* is an outer circumferential surface of the branch pipe 3 and is a visible surface.

The connection portion 4 connects a branch hole inner circumferential surface 2S, which defines the main pipe branch hole 2H, to the branch pipe lower end surface 3*a*. More specifically, the branch hole inner circumferential surface 2S includes an inner layer exposed surface 21*s* from which a part of the main pipe inner layer portion 21 is exposed, and an outer layer exposed surface 22*s* from which a part of the main pipe outer layer portion 22 is exposed. The connection portion 4 covers both the inner layer exposed surface 21*s* and the outer layer exposed surface 22*s*. The branch pipe lower end surface 3*a* includes a lower end flat surface 3*a*1 and a lower end inclined surface 3*a*2. The connection portion 4 covers both the lower end flat surface 3*a*1 and the lower end inclined surface 3*a*2.

Figure 3:
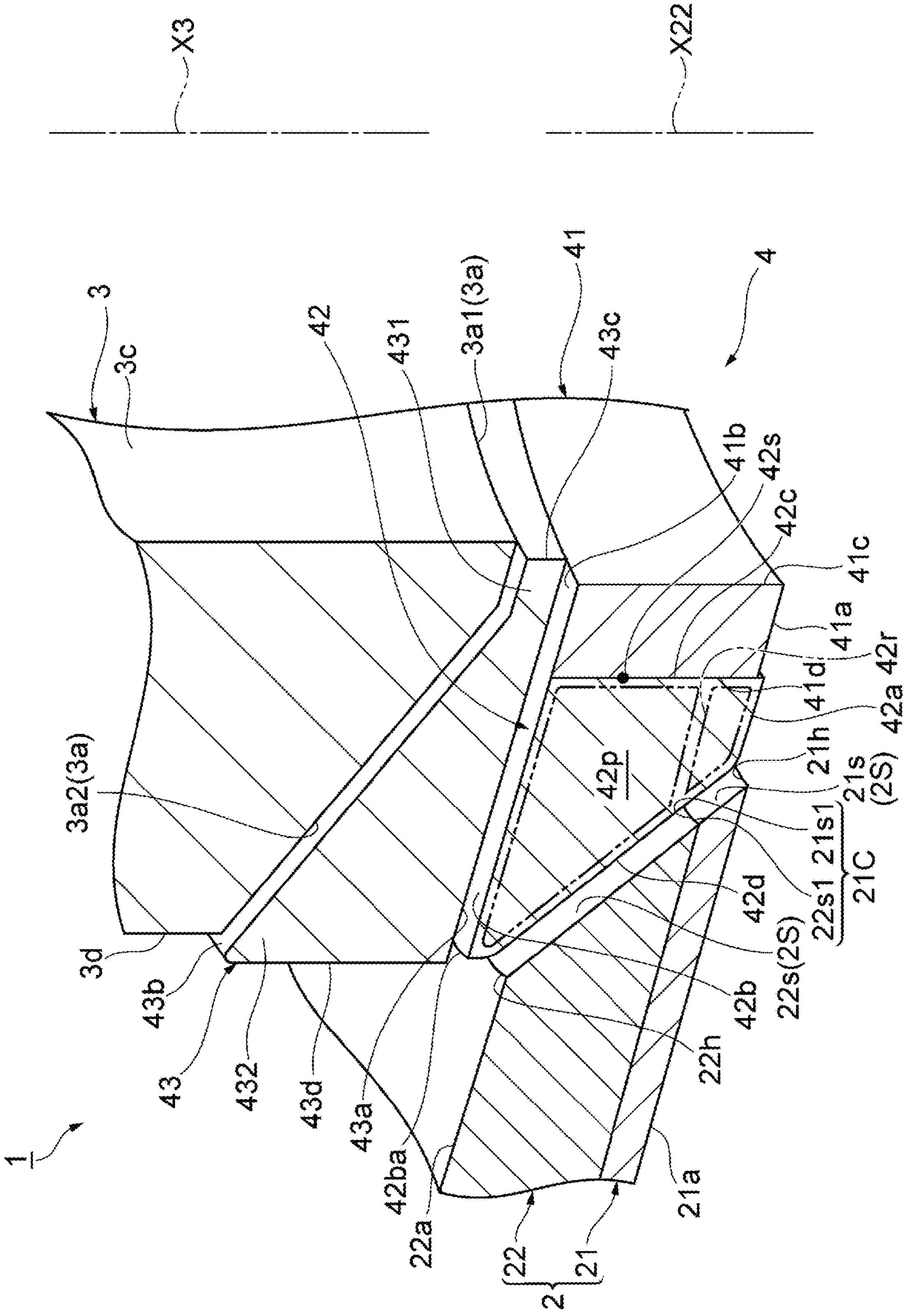
FIG. 3 is a partially enlarged view of FIG. 2.

Moreover, the connection portion 4 will be described in detail with reference to FIG. 3. As illustrated in FIG. 3, the connection portion 4 includes a ring member 41, a main pipe side connection weld portion 42, and a branch pipe side connection weld portion 43.

The ring member 41 is a member that defines a flow path through which a corrosive fluid flows. The ring member 41 is composed of a material having corrosion resistance. The ring member 41 may be formed of, for example, the same material as that of the branch pipe 3. The ring member 41 has a cylindrical shape. The ring member 41 is disposed in the main pipe branch hole 2H. The ring member 41 has an axis overlapping the axis X3. The ring member 41 includes a ring lower end surface 41*a* and a ring upper end surface 41*b*. The ring lower end surface 41*a* is an end surface closer to the axis X21 among the end surfaces of the ring member 41 in the direction along the axis X3. The ring lower end surface 41*a* is an end surface located on the side opposite to the ring upper end surface 41*b*. The ring upper end surface 41*b* is separated from the branch pipe lower end surface 3*a*, and a part of the branch pipe side connection weld portion 43 is sandwiched between the ring upper end surface 41*b* and the branch pipe lower end surface 3*a*. The ring upper end surface 41*b* is substantially flush with the outer layer surface 22*a* in a radial direction about the axis X21.

The ring member 41 includes a ring inner circumferential surface 41*c* and a ring outer circumferential surface 41*d*. The ring inner circumferential surface 41*c* is an inner circumferential surface of the ring member 41. The corrosive fluid comes into contact with the ring inner circumferential surface 41*c*. In the example of FIG. 2, when the branch pipe 3 is viewed from the direction of the axis X3 with reference to the ring inner circumferential surface 41*c*, the branch pipe inner circumferential surface 3*c* of the branch pipe 3 substantially matches the ring inner circumferential surface 41*c*. The ring outer circumferential surface 41*d* is an outer circumferential surface of the ring member 41. The ring outer circumferential surface 41*d* is separated from the branch hole inner circumferential surface 2S of the main pipe 2, and the main pipe side connection weld portion 42 is sandwiched between the ring outer circumferential surface 41*d* and the branch hole inner circumferential surface 2S.

The main pipe side connection weld portion 42 connects the ring member 41 to the main pipe 2. The main pipe side connection weld portion 42 is provided so as to be filled between the ring outer circumferential surface 41*d* and the branch hole inner circumferential surface 2S. In other words, the main pipe side connection weld portion 42 covers the branch hole inner circumferential surface 2S. More specifically, the main pipe side connection weld portion 42 covers a main pipe contact portion 2C included in the branch hole inner circumferential surface 2S. The main pipe contact portion 2C is a portion where an edge 21*s*1 of the inner layer exposed surface 21*s* exposed to the main pipe branch hole 2H and an edge 22*s*1 of the outer layer exposed surface 22*s* are in contact with each other. Since the branch hole inner circumferential surface 2S includes the inner layer exposed surface 21*s* and the outer layer exposed surface 22*s*, both the inner layer exposed surface 21*s* and the outer layer exposed surface 22*s* are not exposed to the flow path through which the corrosive fluid flows. Moreover, the main pipe contact portion 2C is not exposed to the flow path through which the corrosive fluid flows.

The main pipe side connection weld portion 42 is composed of a material having corrosion resistance. The main pipe side connection weld portion 42 includes an inner buildup exposed surface 42*a*, an outer buildup exposed surface 42*b*, a buildup inner circumferential surface 42*c*, and a buildup outer circumferential surface 42*d*.

The inner buildup exposed surface 42*a* intersects the radial direction about the axis X21. The inner buildup exposed surface 42*a* is located between the inner layer surface 21*a* and the ring lower end surface 41*a* when viewed from the internal space of the main pipe 2. The inner buildup exposed surface 42*a* may be flush with the inner layer surface 21*a*. The inner buildup exposed surface 42*a* may be flush with the ring lower end surface 41*a*.

The outer buildup exposed surface 42*b* intersects the radial direction about the axis X21. The outer buildup exposed surface 42*b* is located between the outer layer surface 22*a* and the ring upper end surface 41*b* when viewed from the external space of the main pipe 2. The outer buildup exposed surface 42*b* may be flush with the outer layer surface 22*a*. The outer buildup exposed surface 42*b* may be flush with the ring upper end surface 41*b*.

The outer circumferential edge of the outer buildup exposed surface 42*b* constitutes a buildup outer circumferential edge 42*ba* of the main pipe side connection weld portion 42. When the branch pipe 3 is viewed from the direction of the axis X3 with reference to the buildup outer circumferential edge 42*ba*, the branch pipe outer circumferential surface 3*d* of the branch pipe 3 substantially matches the buildup outer circumferential edge 42*ba*.

Figure 4:
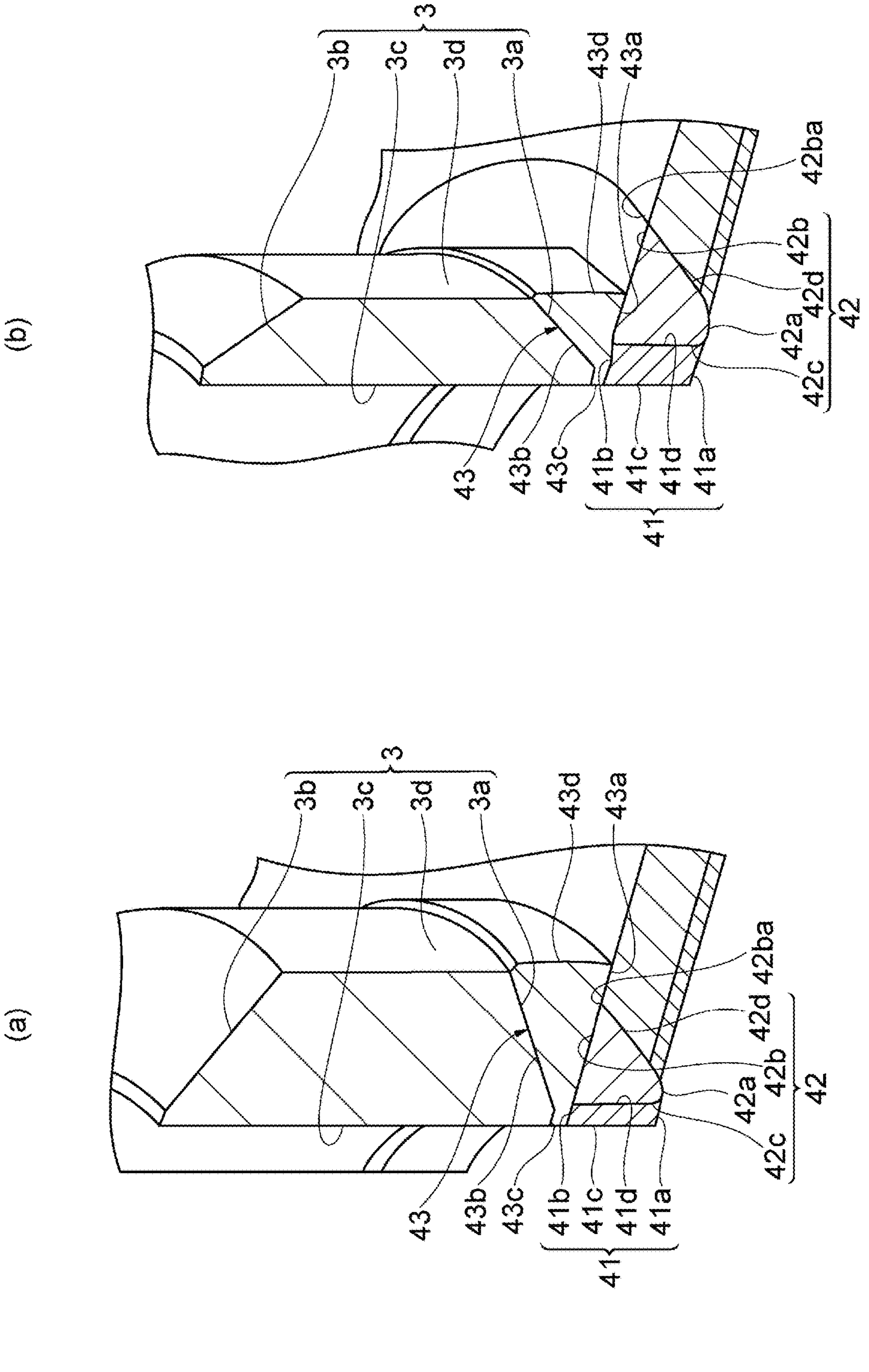
In FIG. 4, (a) is an enlarged cross-sectional perspective view illustrating a branch pipe and a main pipe side connection weld portion of a branching pipe according to a modification example.

Note that the relationship between the branch pipe outer circumferential surface 3*d* of the branch pipe 3 as viewed from the axis X3 and the buildup outer circumferential edge 42*ba* may be the configuration illustrated in (a) and (b) of FIG. 4. In the example illustrated in (a) of FIG. 4, when the branch pipe 3 is viewed from the direction of the axis X3, the branch pipe outer circumferential surface 3*d* of the branch pipe 3 is located outside the buildup outer circumferential edge 42*ba*. In the example illustrated in (b) of FIG. 4, when the branch pipe 3 is viewed from the direction of the axis X3, the branch pipe outer circumferential surface 3*d* of the branch pipe 3 is located inside the buildup outer circumferential edge 42*ba*.

When the ring member 41 and the main pipe side connection weld portion 42 are fused and integrated with each other, a fusion line 42*s* (weld line) caused by welding is formed. The buildup inner circumferential surface 42*c* shares the fusion line 42*s* with the ring outer circumferential surface 41*d*. The fusion line 42*s* illustrated in FIG. 3 has a linear shape. However, the fusion line 42*s* is not limited to the linear shape. In the example of FIG. 3, when the branch pipe 3 is viewed from the direction of the axis X3 with reference to the buildup inner circumferential surface 42*c*, the branch pipe inner circumferential surface 3*c* of the branch pipe 3 is located inward of the buildup inner circumferential surface 42*c*. The buildup outer circumferential surface 42*d* is in contact with the branch hole inner circumferential surface 2S. Since the branch hole inner circumferential surface 2S is an inclined surface, the buildup outer circumferential surface 42*d* is also an inclined surface.

The branch pipe side connection weld portion 43 connects the branch pipe 3 to the ring member 41 and the main pipe side connection weld portion 42. The branch pipe side connection weld portion 43 is composed of a material having corrosion resistance.

The branch pipe side connection weld portion 43 includes a connection weld portion lower end surface 43*a*, a connection weld portion upper end surface 43*b*, a connection weld portion inner circumferential surface 43*c*, and a connection weld portion outer circumferential surface 43*d*.

Moreover, the branch pipe side connection weld portion 43 is provided so as to fill a space between the main pipe side connection weld portion 42 and the branch pipe 3. Specifically, the branch pipe side connection weld portion 43 is provided between the ring member 41 and the branch pipe lower end surface 3*a* and between the main pipe side connection weld portion 42 and the lower end inclined surface 3*a*2. The branch pipe side connection weld portion 43 includes a connection thin wall portion 431 and a connection thick wall portion 432. The connection thin wall portion 431 is located between the ring member 41 and the branch pipe lower end surface 3*a*. The connection thick wall portion 432 is located between the main pipe side connection weld portion 42 and the lower end inclined surface 3*a*2. The connection thin wall portion 431 has a constant thickness. The connection thick wall portion 432 has a thickness that increases with the distance from the connection thin wall portion 431. The branch pipe side connection weld portion 43 connects the branch pipe 3 to the ring member 41 via a part of the connection thick wall portion 432 and the connection thin wall portion 431. The branch pipe side connection weld portion 43 connects the branch pipe 3 to the main pipe side connection weld portion 42 via the connection thick wall portion 432.

The branch pipe side connection weld portion 43 includes the connection weld portion inner circumferential surface 43*c* which is an inner circumferential surface of the branch pipe side connection weld portion 43 and the connection weld portion outer circumferential surface 43*d* which is an outer circumferential surface of the branch pipe side connection weld portion 43. The corrosive fluid comes into contact with the connection weld portion inner circumferential surface 43*c*. The connection weld portion outer circumferential surface 43*d* is located outward of the branch pipe outer circumferential surface 3*d*.

<Material of Main Pipe, Branch Pipe, and Connection Portion>

The branching pipe 1 of the present embodiment constitutes a flow path through which a corrosive fluid flows. Therefore, all the portions in contact with the corrosive fluid are formed of a material having corrosion resistance.

Examples of the material having corrosion resistance include a nickel-chromium-iron alloy and a high-nickel iron-based alloy. An example of the nickel-chromium-iron alloy is Inconel (registered trademark), and includes nickel as a main material, with additive materials such as iron, chromium, niobium, and molybdenum. One specific example of Inconel is Inconel 625 (ALLOY 625). Another specific example of Inconel is ALLOY 82 and ALLOY 182. ALLOY 82 and ALLOY 182 have excellent corrosion resistance, similar to ALLOY 625. According to the American Welding Society (AWS) standards, the standard number for ALLOY 625 is ENiCrMo-3 or ERNiCrMo-3. The standard number for ALLOY 82 is ERNiCr-3. The standard number for ALLOY 182 is ENiCrFe-3. An example of the high-nickel iron-based alloy is Incoloy, and includes titanium, copper, and molybdenum as additive materials in an austenitic nickel-iron-chromium alloy. One specific example of Incoloy is Incoloy 825 (ALLOY 825).

As another material having corrosion resistance, for example, austenitic stainless steel can also be used. Specific examples of the austenitic stainless steel are SUS316L and SUS309LMo. Since SUS309LMo is also used as a material for a welding rod, it can be employed as a material of the connection portion 4 formed by welding.

The metal material exemplified above is generally known as a material having high corrosion resistance. The "material having equivalent corrosion resistance" in the present embodiment means a material included in the metal material exemplified above. That is, examples of materials included in the material having equivalent corrosion resistance include Inconel 625 (ALLOY 625), Incoloy 825 (ALLOY 825), SUS316L, and SUS309LMo. Furthermore, other materials belonging to the nickel-chromium-iron alloy, the high-nickel iron-based alloy, and the austenitic stainless steel may be included in materials having equivalent corrosion resistance.

Specific combinations of materials will be exemplified. However, when constituting the branching pipe 1 of the present embodiment, the present embodiment is not limited to the following combination of materials. For example, in a case where the main pipe inner layer portion 21 is formed by forging, the main pipe inner layer portion 21 and the ring member 41 may be formed of the same material. In a case where the main pipe inner layer portion 21 is formed by buildup welding, the main pipe inner layer portion 21, the main pipe side connection weld portion 42, and the branch pipe side connection weld portion 43 may be formed of the same material.

A first example is as follows.

Main pipe inner layer portion 21: Stainless steel (SUS316L)

Main pipe outer layer portion 22: Carbon steel

Branch pipe 3: Stainless steel (SUS316L)

Ring member 41: Stainless steel (SUS316L)

Main pipe side connection weld portion 42 and Branch pipe side connection weld portion 43: Stainless steel (SUS309LMo)

A second example is as follows.

Main pipe inner layer portion 21: Alloy 625 (nickel-chromium-iron alloy)

Main pipe outer layer portion 22: Carbon steel

Branch pipe 3: Alloy 825 (high-nickel iron-based alloy)

Ring member 41: Alloy 825 (high-nickel iron-based alloy)

Main pipe side connection weld portion 42 and Branch pipe side connection weld portion 43: Alloy 625 (nickel-chromium-iron alloy)

For example, in the first example, the main pipe 2 includes a contact portion between the carbon steel and the stainless steel. Here, when the standard electrode potentials of the respective materials are compared, the standard electrode potential of stainless steel is relatively high, and the standard electrode potential of carbon steel is relatively low. That is, the stainless steel is hardly ionized, and the carbon steel is easily ionized. This difference in ionization tendency causes so-called galvanic corrosion. However, in the branching pipe 1 of the present embodiment, a contact portion between the main pipe inner layer portion 21 made of stainless steel and the main pipe outer layer portion 22 made of carbon steel is covered by the main pipe side connection weld portion 42. Therefore, since the portion with which the dissimilar metals are in contact is not exposed to the corrosive fluid, the occurrence of galvanic corrosion can be suppressed.

Moreover, the main pipe inner layer portion 21, the branch pipe 3, the main pipe side connection weld portion 42, and the branch pipe side connection weld portion 43, which are portions exposed to the corrosive fluid, are all made of austenitic stainless steel or a nickel alloy. In these materials, even when specific composition ratios are different, the galvanic corrosion basically does not occur since the materials have standard electrode potentials close to each other.

That is, the branching pipe 1 of the present embodiment ensures corrosion resistance to a corrosive fluid for two reasons: first, a portion in which dissimilar metals are in contact with each other is not exposed to the corrosive fluid, and second, a portion exposed to the corrosive fluid is composed of materials having high corrosion resistance and standard electrode potentials close to each other.

Next, a flow path in a case where the corrosive fluid flows from the main pipe 2 toward the branch pipe 3 in the branching pipe 1 will be described. In a case where the corrosive fluid flows from the main pipe 2 toward the branch pipe 3, the corrosive fluid first flows in a region defined by the inner layer surface 21*a* constituted by the main pipe inner layer portion 21 of the main pipe 2. Next, the corrosive fluid flowing toward the main pipe branch hole 2H flows along the inner buildup exposed surface 42*a* of the main pipe side connection weld portion 42, the ring lower end surface 41*a* of the ring member 41, and the ring inner circumferential surface 41*c* of the ring member 41. Next, the corrosive fluid flows along the connection weld portion inner circumferential surface 43*c* of the branch pipe side connection weld portion 43 and the branch pipe inner circumferential surface 3*c* of the branch pipe 3. Therefore, the flow path formed by the main pipe 2, the branch pipe 3, and the connection portion 4 is defined by the inner layer surface 21*a*, the inner buildup exposed surface 42*a*, the ring lower end surface 41*a*, the ring inner circumferential surface 41*c*, the connection weld portion inner circumferential surface 43*c*, and the branch pipe inner circumferential surface 3*c*.

Figure 5:
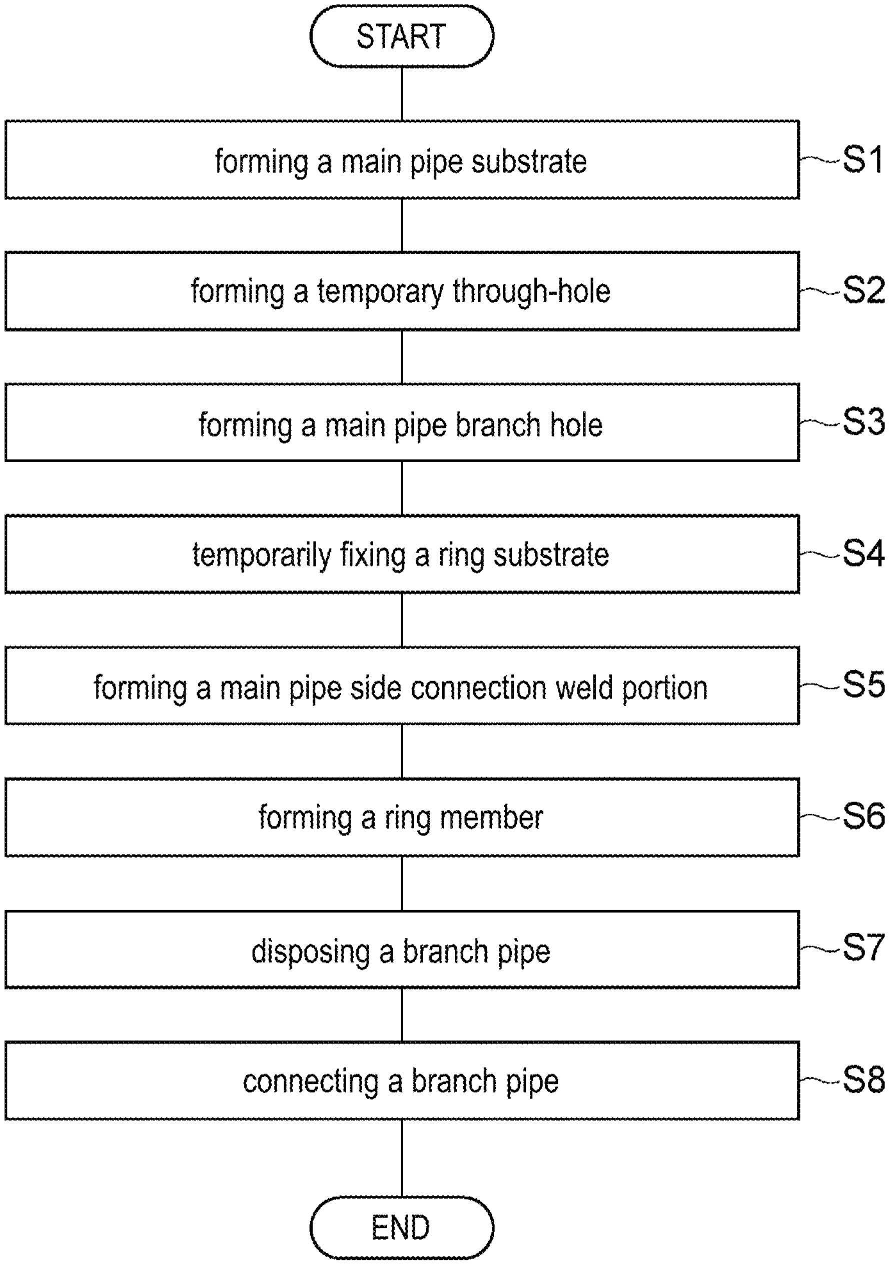
FIG. 5 is a flowchart of a method for manufacturing a branching pipe.
Figure 6:
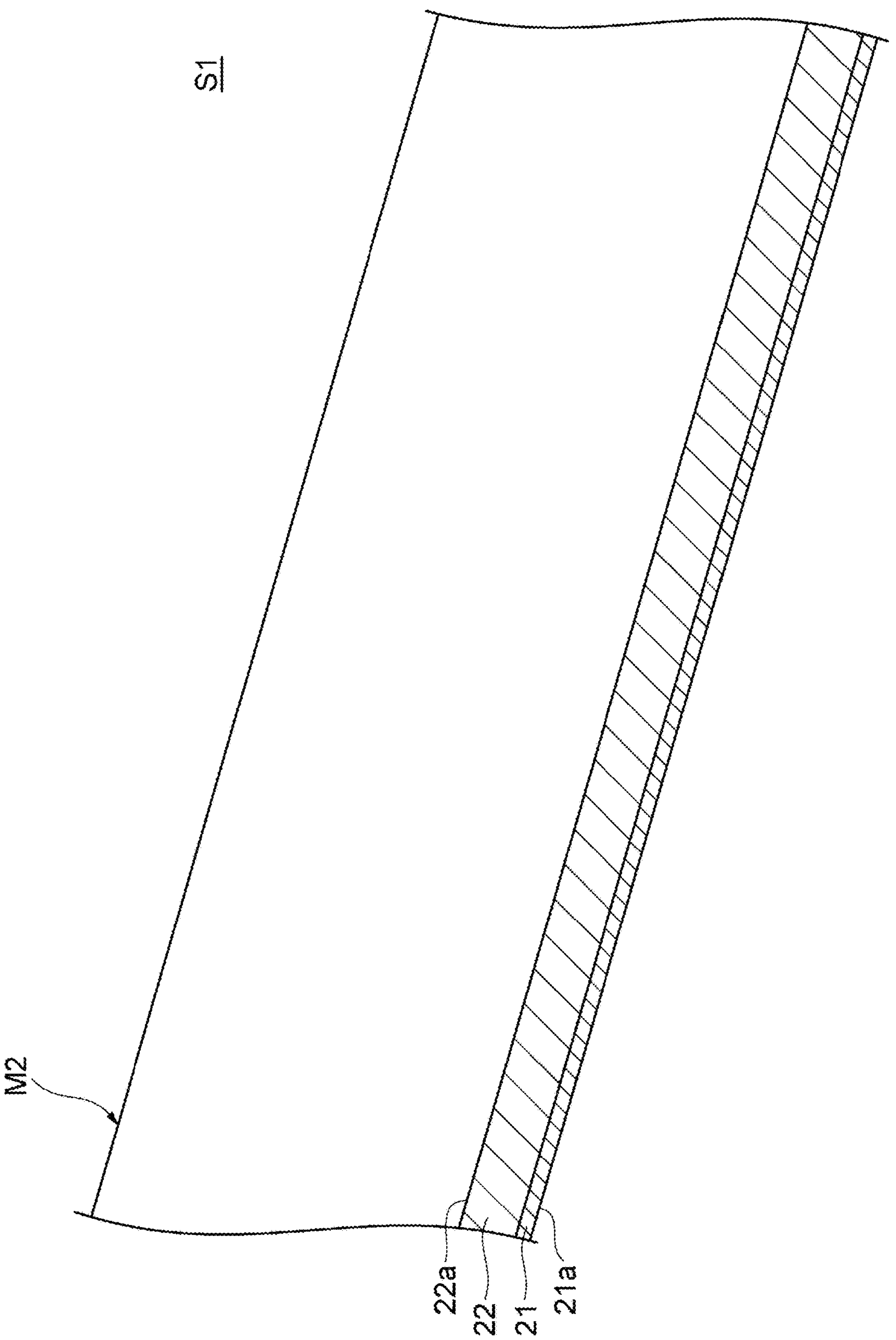
FIG. 6 is a perspective view illustrating a main pipe substrate.
Figure 7:
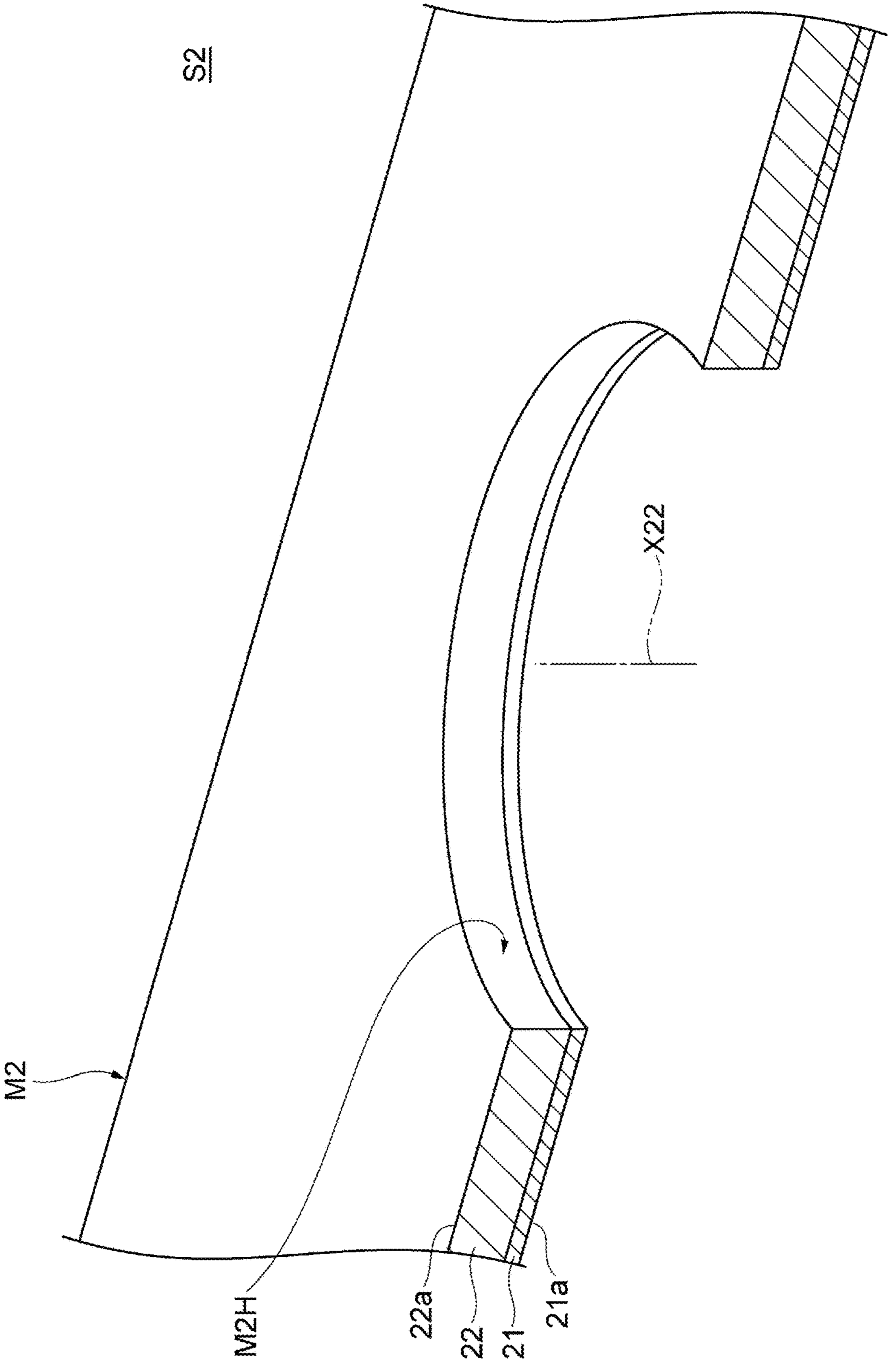
FIG. 7 is a view illustrating a step of forming a temporary through-hole in a main pipe substrate.
Figure 8:
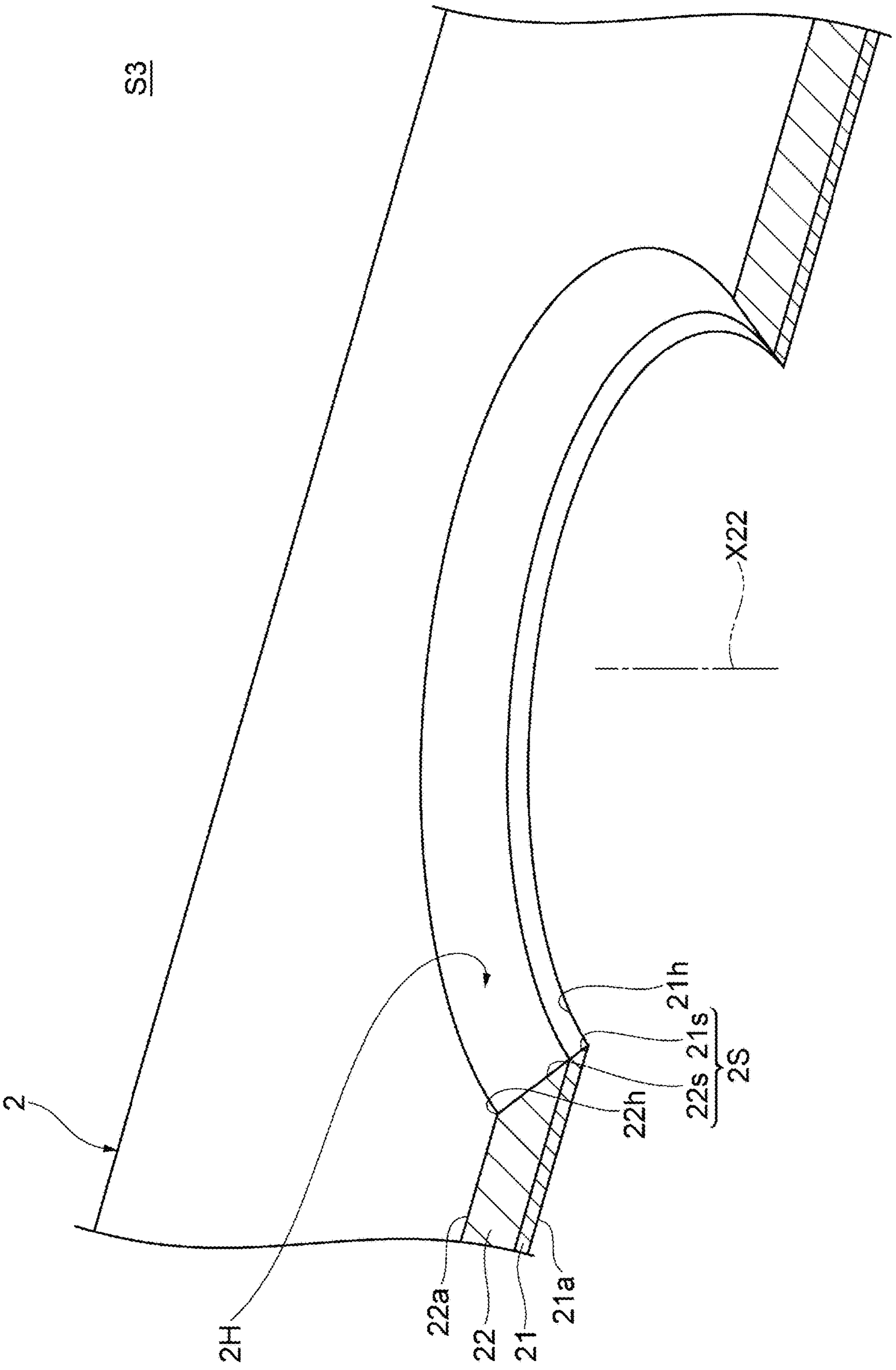
FIG. 8 is a view illustrating a step of forming a main pipe branch hole.
Figure 9:
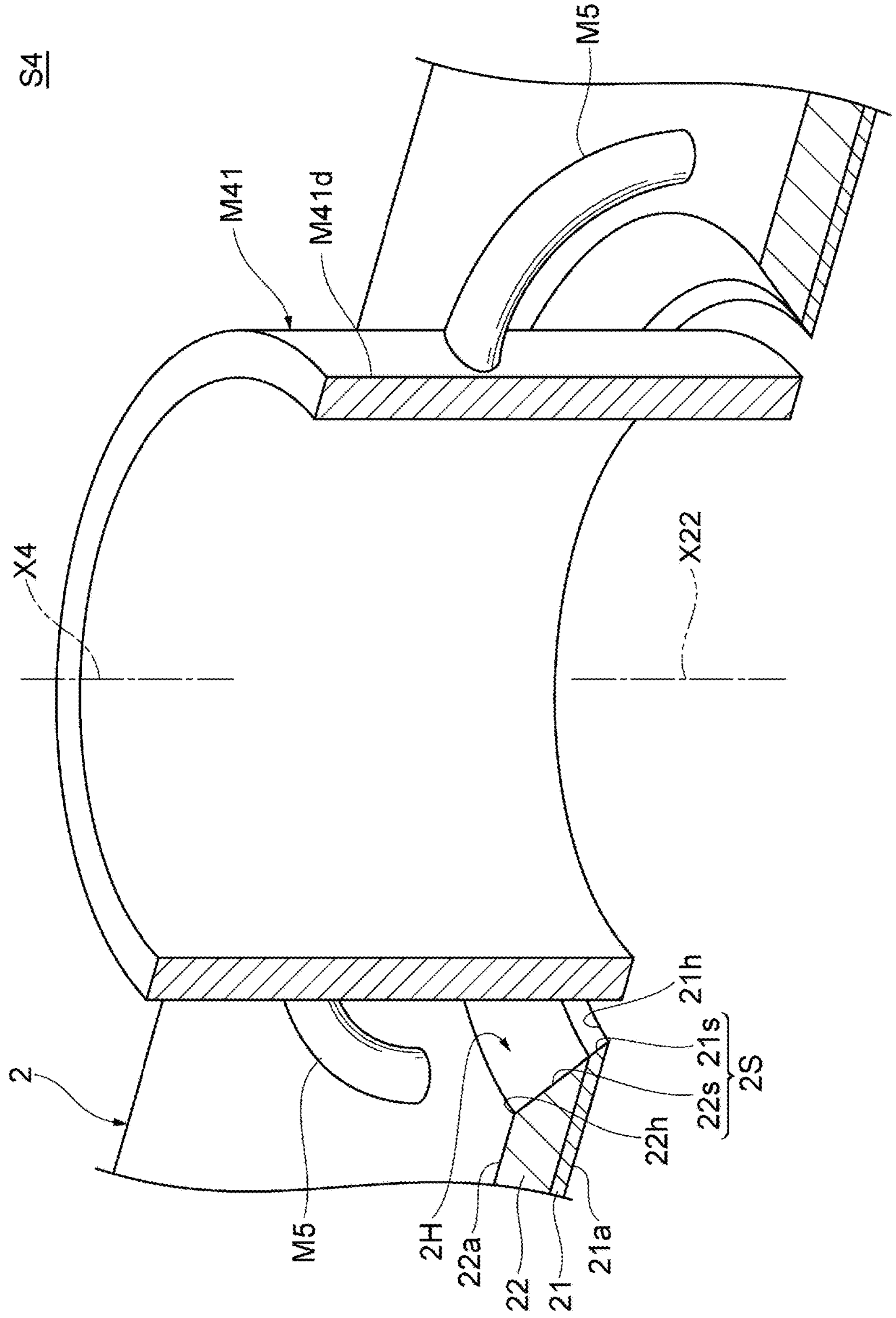
FIG. 9 is a view illustrating a step of temporarily fixing a ring substrate to a main pipe.
Figure 10:
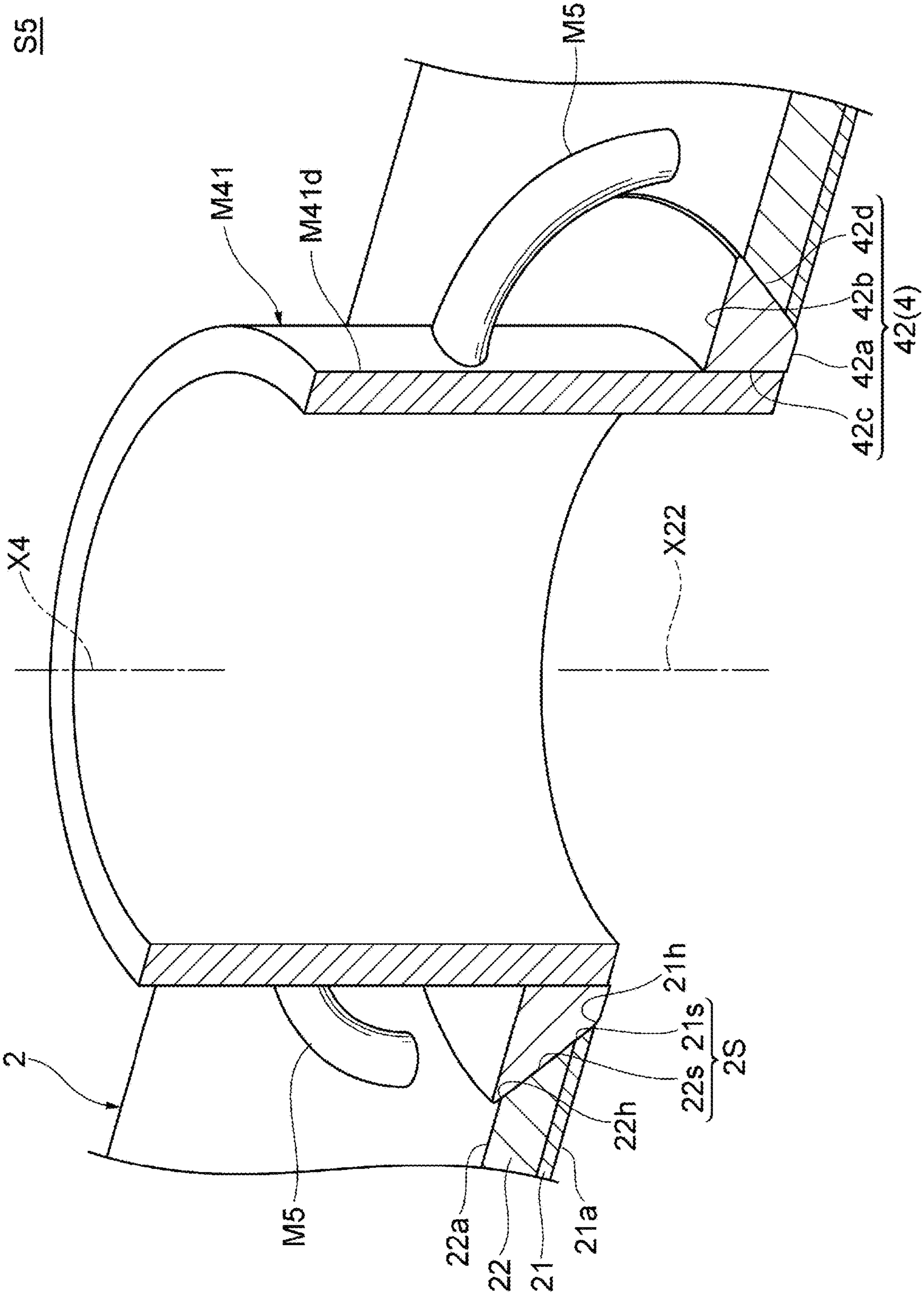
FIG. 10 is a view illustrating a step of forming a main pipe side connection weld portion.
Figure 11:
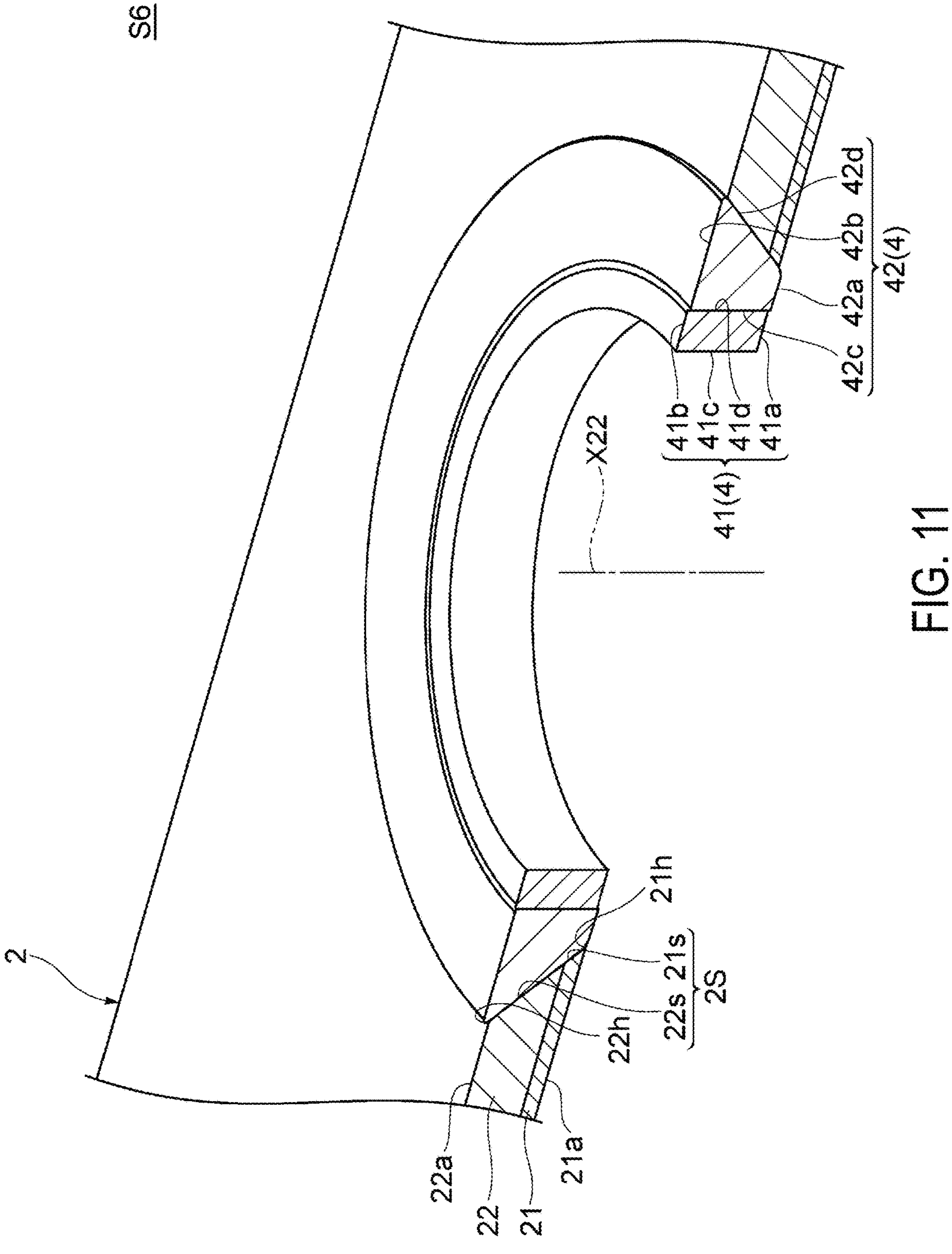
FIG. 11 is a view illustrating a step of forming a ring member.
Figure 12:
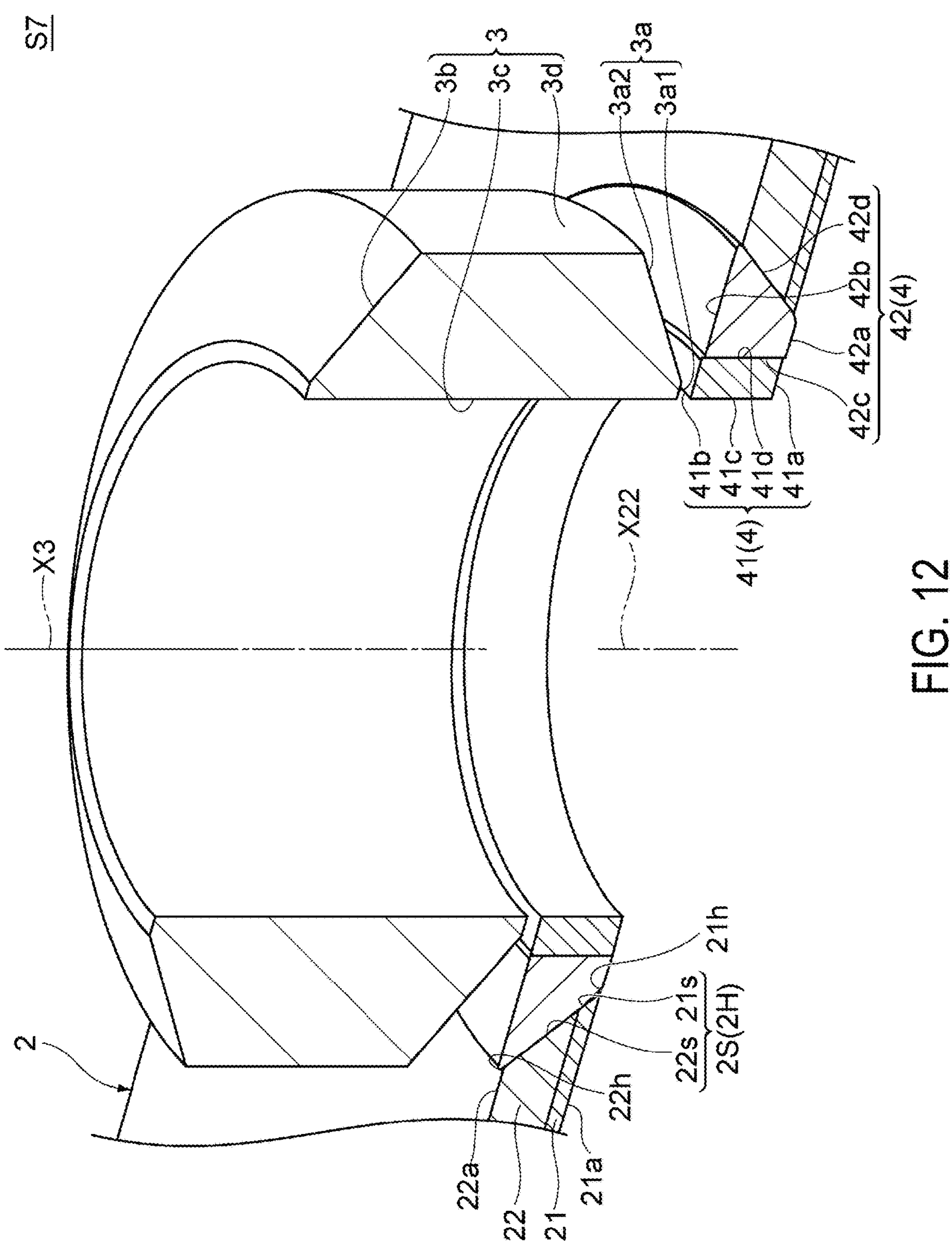
FIG. 12 is a view illustrating a step of connecting a branch pipe.

Next, a method for manufacturing the branching pipe 1 of the present embodiment will be described with reference to FIGS. 5 to 12. FIG. 5 is a flowchart of a method for manufacturing the branching pipe 1. FIG. 6 is a perspective view illustrating a main pipe substrate M2. FIG. 7 is a view illustrating a step of forming a temporary through-hole M2H in the main pipe substrate M2. FIG. 8 is a view illustrating a step of forming the main pipe branch hole 2H. FIG. 9 is a view illustrating a step of temporarily fixing a ring substrate M41 to the main pipe 2. FIG. 10 is a view illustrating a step of forming the main pipe side connection weld portion 42. FIG. 11 is a view illustrating a step of forming the ring member 41. FIG. 12 is a view illustrating a step of connecting the branch pipe 3.

First, as illustrated in FIG. 6, a main pipe substrate M2 is prepared (S1). The main pipe substrate M2 is mainly different from the main pipe 2 in that the main pipe branch hole 2H is not formed. Subsequently, as illustrated in FIG. 7, a temporary through-hole M2H is formed in the main pipe substrate M2 (S2). The diameter of the temporary through-hole M2H is constant.

Subsequently, as illustrated in FIG. 8, a main pipe branch hole 2H is formed (S3). The main pipe branch hole 2H is formed by cutting the inner circumferential surface of the temporary through-hole M2H. The main pipe 2 is obtained by forming the main pipe branch hole 2H.

Subsequently, as illustrated in FIG. 9, a ring substrate M41 is temporarily fixed to the main pipe 2 (S4). The ring substrate M41 is a member for the ring member 41. The ring substrate M41 has a cylindrical shape. The length of the ring substrate M41 is longer than that of the ring member 41. In the subsequent step (S6), the ring substrate M41 is cut to form the ring member 41 having a predetermined length.

The outer circumferential surface M41*d* of the ring substrate M41 is not in contact with the branch hole inner circumferential surface 2S of the main pipe 2. The lower end surface of the ring substrate M41 substantially matches the inner layer surface 21*a* of the main pipe 2. The ring substrate M41 is fixed to the main pipe 2 by a temporary weld portion M5. The temporary weld portion M5 has a shape curved away from the ring substrate M41. One end of the temporary weld portion M5 is connected to the outer layer surface 22*a*. The other end of the temporary weld portion M5 is connected to the outer circumferential surface M41*d* of the ring substrate M41. FIG. 9 illustrates two temporary weld portions M5. The number of temporary weld portions M5 for temporarily fixing the ring substrate M41 is arbitrary.

Subsequently, as illustrated in FIG. 10, a main pipe side connection weld portion 42 is formed (S5). The main pipe side connection weld portion 42 is formed by, for example, gas tungsten arc welding (GTAW welding). For example, a welding rod for arc welding is inserted from the outer-layer-side opening 22*h* of the main pipe branch hole 2H toward the inner-layer-side opening 21*h*. Then, between the outer circumferential surface M41*d* of the ring substrate M41 and the branch hole inner circumferential surface 2S, the main pipe side connection weld portion 42 is formed from the inner-layer-side opening 21*h* toward the outer-layer-side opening 22*h*. The main pipe side connection weld portion 42 is formed to match the position of the outer layer surface 22*a* or protrude from the outer layer surface 22*a*.

Note that in a case where the main pipe 2 has a large wall thickness, the main pipe side connection weld portion 42 may be formed by different types of welding. For example, the main pipe side connection weld portion 42 includes a weld lower layer portion 42*r* including a portion in contact with the inner layer exposed surface 21*s* and the inner buildup exposed surface 42*a*, and a weld upper layer portion 42*p* including a portion in contact with the outer layer exposed surface 22*s* and the outer buildup exposed surface 42*b*. As described above, both the weld lower layer portion 42*r* and the weld upper layer portion 42*p* may be formed by gas tungsten arc welding. Furthermore, the weld lower layer portion 42*r* may also be formed by gas tungsten arc welding, and the weld upper layer portion 42*p* may be formed by shielded metal arc welding (SMAW welding) or flux-cored arc welding (FCAW welding).

Subsequently, as illustrated in FIG. 11, the ring member 41 is formed (S6). More specifically, a portion of the ring substrate M41 protruding from the main pipe branch hole 2H is cut. The ring substrate M41 is cut in a direction orthogonal to the direction along the axis X22. The ring upper end surface 41*b* of the ring member 41 obtained as a result of the cutting may be flush with the outer layer surface 22*a*. In this case, the ring upper end surface 41*b* has a curved surface along the outer layer surface 22*a*. Furthermore, the ring upper end surface 41*b* may protrude from the outer layer surface 22*a*. In this case, the ring upper end surface 41*b* is a plane orthogonal to the axis X3. Note that, in this step S6, a part of the main pipe side connection weld portion 42 may be cut. As a result of such cutting or grinding, the outer buildup exposed surface 42*b* may be formed. In this case, the outer buildup exposed surface 42*b* may be flush with the outer layer surface 22*a* and may have a curved surface along the outer layer surface 22*a*.

Subsequently, as illustrated in FIG. 12, the branch pipe 3 is disposed (S7). Specifically, the branch pipe 3 is separated from the ring member 41 in the direction along the axis X3 and disposed at a position facing the main pipe side connection weld portion 42.

The branch pipe side connection weld portion 43 is formed between the branch pipe 3 and the ring member 41 and between the branch pipe 3 and the main pipe side connection weld portion 42 (S8). The welding rod is inserted between the branch pipe 3 and the main pipe side connection weld portion 42 from the branch pipe outer circumferential surface 3*d* side of the branch pipe 3, and the distal end of the welding rod is positioned between the branch pipe 3 and the ring member 41. The branch pipe side connection weld portion 43 is formed by moving the distal end of the welding rod to the outer circumferential side while rotating the distal end about the axis X3. As a result, the branch pipe 3 is connected to the ring member 41 and the main pipe side connection weld portion 42.

<Actions and Effects>

The branching pipe 1 includes: a main pipe 2 that includes the main pipe inner layer portion 21 and the main pipe outer layer portion 22 surrounding the main pipe inner layer portion 21, the main pipe 2 being provided with a main pipe branch hole 2H which penetrates through the main pipe inner layer portion 21 and the main pipe outer layer portion 22, and in the main pipe branch hole 2H, the diameter of an opening formed in the outer layer surface 22*a* which is the outer circumferential surface of the main pipe outer layer portion 22 is larger than the diameter of an opening formed in the inner layer surface 21*a* which is the inner circumferential surface of the main pipe inner layer portion 21; the branch pipe 3 extending in a direction intersecting the direction of the axis X21 of the main pipe 2; and the connection portion 4 connecting the end of the branch pipe 3 to the outer layer surface 22*a* of the main pipe 2. The connection portion 4 includes the main pipe side connection weld portion 42 that covers the main pipe contact portion 2C in which the main pipe inner layer portion 21 is in contact with the main pipe outer layer portion 22 and which is exposed at the main pipe branch hole 2H, and the branch pipe side connection weld portion 43 that is provided between the main pipe side connection weld portion 42 and the end of the branch pipe 3 and connects the branch pipe 3 to the main pipe 2. The main pipe outer layer portion 22 is composed of a material different from that of the main pipe inner layer portion 21.

The diameter of the opening formed in the outer layer surface 22*a* is larger than the diameter of the opening formed in the inner layer surface 21*a*. With the main pipe branch hole 2H having such a configuration, since the welding rod is easily inserted from the opening formed in the outer layer surface 22*a* toward the opening formed in the inner layer surface 21*a*, the main pipe side connection weld portion 42 can be easily provided at the portion in which the main pipe inner layer portion 21 and the main pipe outer layer portion 22 are in contact with each other. Therefore, since the fluid does not come into contact with the portion in which the main pipe inner layer portion 21 and the main pipe outer layer portion 22 are in contact with each other, the occurrence of galvanic corrosion can be suppressed.

The main pipe side connection weld portion 42 includes the inner buildup exposed surface 42*a* exposed from the inner layer surface 21*a*. In this configuration, the inner buildup exposed surface 42*a* is exposed from the inner layer surface 21*a* of the main pipe 2. As a result, the main pipe side connection weld portion 42 covers a region from the portion in which the main pipe inner layer portion 21 and the main pipe outer layer portion 22 are in contact with each other to the opening formed in the inner layer surface 21*a*. Therefore, since the fluid is less likely to reach the portion in which the main pipe inner layer portion 21 and the main pipe outer layer portion 22 are in contact with each other, the occurrence of galvanic corrosion can be further suppressed.

The area of the outer buildup exposed surface 42*b* along the outer layer surface 22*a* is larger than the area of the inner buildup exposed surface 42*a*. In this configuration, it is possible to ensure a large region in which the main pipe side connection weld portion 42 and the branch pipe side connection weld portion 43 are in contact with each other. As a result, the main pipe side connection weld portion 42 can be favorably connected to the branch pipe side connection weld portion 43.

The connection portion 4 further includes the ring member 41 disposed in the main pipe branch hole 2H. The main pipe side connection weld portion 42 includes the buildup outer circumferential surface 42*d* that is in contact with the branch hole inner circumferential surface 2S which is the inner circumferential surface of the main pipe branch hole 2H and covers the main pipe contact portion 2C, and the buildup inner circumferential surface 42*c* that is in contact with the ring outer circumferential surface 41*d* which is the outer circumferential surface of the ring member 41. In this configuration, the inner circumferential surface of the ring member 41 disposed in the main pipe branch hole 2H defines the flow path. As a result, the flow path can have a desired configuration.

The flow path formed by the main pipe 2, the branch pipe 3, and the connection portion 4 is defined by the inner layer surface 21*a*, the inner buildup exposed surface 42*a*, the ring inner circumferential surface 41*c* which is the inner circumferential surface of the ring member 41, the connection weld portion inner circumferential surface 43*c* which is the inner circumferential surface of the branch pipe side connection weld portion 43, and the branch pipe inner circumferential surface 3*c* which is the inner circumferential surface of the branch pipe 3. The main pipe inner layer portion 21, the main pipe side connection weld portion 42, the ring member 41, the branch pipe side connection weld portion 43, and the branch pipe 3 are composed of materials having corrosion resistance equivalent to each other. In this configuration, a flow path through which a corrosive fluid flows can be formed of materials having corrosion resistance equivalent to each other.

When viewed from the direction of the axis X3 of the branch pipe 3, the position of the outer circumferential edge of the branch pipe 3 may be outward of the position of the outer circumferential edge of the main pipe side connection weld portion 42 (see (a) of FIG. 4). In this configuration, the relatively thick branch pipe 3 can be connected.

In the branching pipe 1 of the embodiment, when viewed from the direction of the axis X3 of the branch pipe 3, the position of the outer circumferential edge of the branch pipe 3 may be inward of the position of the outer circumferential edge of the main pipe side connection weld portion 42 (see (b) of FIG. 4). In this configuration, the relatively thin branch pipe 3 can be connected.

In the branching pipe 1 of the embodiment, when viewed from the direction of the axis X3 of the branch pipe 3, the position of the inner circumferential edge of the branch pipe 3 is inward of the position of the inner circumferential edge of the main pipe side connection weld portion 42. In this configuration, a step is provided between the inner circumferential surface of the branch pipe 3 and the inner circumferential surface of the main pipe side connection weld portion 42. The ring member 41 can be disposed on this step.

A method for manufacturing the branching pipe 1 includes: steps of forming, in the main pipe 2 including the main pipe inner layer portion 21 and the main pipe outer layer portion 22 surrounding the main pipe inner layer portion 21 and composed of a material different from that of the main pipe inner layer portion 21, the main pipe branch hole 2H which penetrates through the main pipe inner layer portion 21 and the main pipe outer layer portion 22 and in which the diameter of the opening formed in the outer layer surface 22*a* which is the outer circumferential surface of the main pipe outer layer portion 22 is larger than the diameter of the opening formed in the inner layer surface 21*a* which is the inner circumferential surface of the main pipe inner layer portion 21 (S2 and S3); a step of forming the main pipe side connection weld portion 42 that covers the main pipe contact portion 2C in which the main pipe inner layer portion 21 and the main pipe outer layer portion 22 are in contact with each other and which is exposed at the main pipe branch hole 2H (S5); and a step of forming, between the end of the branch pipe 3 extending in a direction intersecting the direction of the axis X21 of the main pipe 2 and disposed to face the main pipe side connection weld portion 42 and the main pipe side connection weld portion 42, the branch pipe side connection weld portion 43 connecting the branch pipe 3 to the main pipe 2 (S8).

In the method for manufacturing the branching pipe 1, the main pipe branch hole 2H is provided in which the diameter of the opening formed in the outer layer surface 22*a* is larger than the diameter of the opening formed in the inner layer surface 21*a* (S2 and S3). With the main pipe branch hole 2H having such a configuration, in step S5, since the welding rod is easily inserted from the opening formed in the outer layer surface 22*a* toward the opening formed in the inner layer surface 21*a*, the main pipe side connection weld portion 42 can be easily provided at the portion in which the main pipe inner layer portion 21 and the main pipe outer layer portion 22 are in contact with each other. Therefore, since the fluid does not come into contact with the portion in which the main pipe inner layer portion 21 and the main pipe outer layer portion 22 are in contact with each other, the occurrence of galvanic corrosion can be suppressed.

The method further includes steps (S4 and S6) of providing the ring member 41 in the main pipe branch hole 2H after steps (S2 and S3) of forming the main pipe branch hole 2H. In step (S5) of forming the main pipe side connection weld portion 42, the main pipe side connection weld portion 42 is formed between the branch hole inner circumferential surface 2S which is the inner circumferential surface of the main pipe branch hole 2H and the ring outer circumferential surface 41*d* which is the outer circumferential surface of the ring member 41. In this step, the flow path of the fluid can be defined by the inner circumferential surface of the ring member 41 disposed in the main pipe branch hole 2H. As a result, the flow path can have a desired configuration.

Although some embodiments of the present invention have been described above, the branching pipe and the method for manufacturing the branching pipe according to the present invention are not limited to the aspects described in the embodiments described above.

In the above-described embodiments, it is not specified whether or not the branch pipe 3 is a clad pipe. The branch pipe 3 may be a clad pipe or may not be a clad pipe. In a case where the clad pipe is used as the branch pipe 3 (Olet), as the material of the branch pipe inner layer portion of the branch pipe 3, the same material as that of the main pipe side connection weld portion 42 and the branch pipe side connection weld portion 43 is only required to be selected. Furthermore, in a case where a pipe material that is not a clad pipe is used as the branch pipe 3, the same material as that of the ring member 41 is only required to be selected as the material of the branch pipe 3.

The invention claimed is:

1. A branching pipe comprising:

a main pipe that includes a main pipe inner layer portion and a main pipe outer layer portion surrounding the main pipe inner layer portion, the main pipe being provided with a main pipe branch hole which penetrates through the main pipe inner layer portion and the main pipe outer layer portion, and in the main pipe branch hole, a diameter of an opening formed in an outer layer surface which is an outer circumferential surface of the main pipe outer layer portion is larger than a diameter of an opening formed in an inner layer surface which is an inner circumferential surface of the main pipe inner layer portion;

a branch pipe that extends in a direction intersecting an axial direction of the main pipe; and a connection portion that connects an end of the branch pipe to the outer layer surface of the main pipe, wherein the connection portion includes:

a main pipe side connection weld portion that covers a main pipe contact portion in which the main pipe inner layer portion and the main pipe outer layer portion are in contact with each other and which is exposed at the main pipe branch hole, a branch pipe side connection weld portion that is provided between the main pipe side connection weld portion and the end of the branch pipe and connects the branch pipe to the main pipe, and a ring member disposed in the main pipe branch hole, wherein the main pipe outer layer portion is composed of a material different from that of the main pipe inner layer portion, wherein the main pipe side connection weld portion includes:

an inner buildup exposed surface exposed from the inner layer surface, a buildup outer circumferential surface that is in contact with a branch hole inner circumferential surface that is an inner circumferential surface of the main pipe branch hole and covers the main pipe contact portion, and a buildup inner circumferential surface that is in contact with a ring outer circumferential surface that is an outer circumferential surface of the ring member.

2. The branching pipe according to claim 1, wherein an area of the main pipe side connection weld portion along the outer layer surface is larger than an area of the inner buildup exposed surface.

3. The branching pipe according to claim 1, wherein a flow path formed by the main pipe, the branch pipe, and the connection portion is defined by the inner layer surface, the inner buildup exposed surface, a ring inner circumferential surface which is an inner circumferential surface of the ring member, a connection weld portion inner circumferential surface which is an inner circumferential surface of the branch pipe side connection weld portion, and a branch pipe inner circumferential surface which is an inner circumferential surface of the branch pipe, and the main pipe inner layer portion, the main pipe side connection weld portion, the ring member, the branch pipe side connection weld portion, and the branch pipe are composed of materials having corrosion resistance equivalent to each other.

4. The branching pipe according to claim 1, wherein when viewed from an axial direction of the branch pipe, a position of an outer circumferential edge of the branch pipe is outward of a position of an outer circumferential edge of the main pipe side connection weld portion.

5. The branching pipe according to claim 1, wherein when viewed from an axial direction of the branch pipe, a position of an outer circumferential edge of the branch pipe is inward of a position of an outer circumferential edge of the main pipe side connection weld portion.

6. The branching pipe according to claim 1, wherein when viewed from an axial direction of the branch pipe, a position of an inner circumferential edge of the branch pipe is inward of a position of an inner circumferential edge of the main pipe side connection weld portion.

7. A method for manufacturing a branching pipe, the method comprising:

a step of forming, in a main pipe including a main pipe inner layer portion and a main pipe outer layer portion surrounding the main pipe inner layer portion and composed of a material different from that of the main pipe inner layer portion, a main pipe branch hole which penetrates through the main pipe inner layer portion and the main pipe outer layer portion and in which a diameter of an opening formed in an outer layer surface which is an outer circumferential surface of the main pipe outer layer portion is larger than a diameter of an opening formed in an inner layer surface which is an inner circumferential surface of the main pipe inner layer portion;

a step of providing a ring member in the main pipe branch hole;

a step of forming a main pipe side connection weld portion that covers a main pipe contact portion in which the main pipe inner layer portion and the main pipe outer layer portion are in contact with each other and which is exposed at the main pipe branch hole; and a step of forming, between an end of a branch pipe extending in a direction intersecting an axial direction of the main pipe and disposed to face the main pipe side connection weld portion and the main pipe side connection weld portion, a branch pipe side connection weld portion connecting the branch pipe to the main pipe, wherein in the step of forming the main pipe side connection weld portion, the main pipe side connection weld portion is formed between a branch hole inner circumferential surface which is an inner circumferential surface of the main pipe branch hole and a ring outer circumferential surface which is an outer circumferential surface of the ring member.

* * * * *